US012086256B2

(12) United States Patent
Smith et al.

(10) Patent No.: US 12,086,256 B2
(45) Date of Patent: Sep. 10, 2024

(54) USING SECURE ENCLAVES AND DYNAMIC MEASUREMENTS

(71) Applicant: Intel Corporation, Santa Clara, CA (US)

(72) Inventors: Ned M. Smith, Beaverton, OR (US); Bing Zhu, Minhang (CN)

(73) Assignee: Intel Corporation, Santa Clara, CA (US)

( * ) Notice: Subject to any disclaimer, the term of this patent is extended or adjusted under 35 U.S.C. 154(b) by 269 days.

(21) Appl. No.: 17/638,694

(22) PCT Filed: Sep. 27, 2019

(86) PCT No.: PCT/CN2019/108379
§ 371 (c)(1),
(2) Date: Feb. 25, 2022

(87) PCT Pub. No.: WO2021/056379
PCT Pub. Date: Apr. 1, 2021

(65) Prior Publication Data
US 2022/0358220 A1    Nov. 10, 2022

(51) Int. Cl.
*G06F 21/57*    (2013.01)
*G06F 21/53*    (2013.01)

(52) U.S. Cl.
CPC .............. *G06F 21/57* (2013.01); *G06F 21/53* (2013.01); *G06F 2221/034* (2013.01)

(58) Field of Classification Search
CPC ..... G06F 21/57; G06F 21/53; G06F 2221/034
See application file for complete search history.

(56) References Cited

U.S. PATENT DOCUMENTS

2015/0026426 A1    1/2015    Sahita et al.
2015/0326584 A1    11/2015    Karame et al.
(Continued)

FOREIGN PATENT DOCUMENTS

CN    105184113 A    12/2015
CN    108667771 A    10/2018
(Continued)

OTHER PUBLICATIONS

"European Application Serial No. 19947130.1, Response filed Sep. 27, 2023 to Extended European Search Report mailed May 9, 2023", 13 pgs.
(Continued)

*Primary Examiner* — Beemnet W Dada
(74) *Attorney, Agent, or Firm* — Schwegman Lundberg & Woessner, P.A.

(57) ABSTRACT

Methods, apparatus, systems and machine-readable storage media to enable fast boot of secure and unsecure environments in a computing system are disclosed. Root of trust hardware is used to provide dynamic root of trust measurements of various virtual machines, operating systems, and application environments within the computing system. In an example, a trusted application for a trusted environment is initiated with a fast boot process, with use of a secure enclave accessed by an operating system and virtual machine. The root of trust hardware is used to perform dynamic integrity measurements of a second virtual machine and an untrusted application, to later initiate this untrusted application securely after verification of the integrity measurements. Further uses and coordination of dynamic root of trust measurements and application execution, booting, and security verification processes are also described.

23 Claims, 9 Drawing Sheets

(56) References Cited

U.S. PATENT DOCUMENTS

| | | | |
|---|---|---|---|
| 2016/0110554 A1 | 4/2016 | Kang et al. | |
| 2016/0147619 A1 | 5/2016 | Borthakur et al. | |
| 2016/0306966 A1* | 10/2016 | Srivastava | H04L 9/30 |
| 2019/0103074 A1 | 4/2019 | Chhabra et al. | |
| 2019/0220625 A1 | 7/2019 | Durham et al. | |

FOREIGN PATENT DOCUMENTS

| | | |
|---|---|---|
| CN | 108701185 A | 10/2018 |
| WO | 2016168487 | 10/2016 |
| WO | WO-2017005276 A1 | 1/2017 |
| WO | WO-2021056379 A1 | 4/2021 |

OTHER PUBLICATIONS

"European Application Serial No. 19947130.1, Extended European Search Report mailed May 9, 2023", 6 pgs.

"International Application Serial No. PCT/CN2019/108379, International Search Report mailed May 28, 2020", 4 pgs.

"International Application Serial No. PCT/CN2019/108379, Written Opinion mailed May 28, 2020", 4 pgs.

* cited by examiner

USING SECURE ENCLAVES AND DYNAMIC MEASUREMENTS

PRIORITY APPLICATION

This application is a U.S. National Stage Application under 35 U.S.C. 371 from International Application No. PCT/CN2019/108379, filed 27 Sep. 2019, published as WO 2021/056379, which is incorporated herein by reference in its entirety.

TECHNICAL FIELD

Embodiments described herein generally relate to security and application execution techniques for devices, and in particular, to verification and authentication techniques for a trusted execution environment provided using a secure enclave and dynamic root-of-trust measurements.

BACKGROUND

Industrial Internet-of-things (IIoT) use cases, including those in some automotive operational environments, often have strict boot performance requirements. For example, National Highway Traffic Safety Administration (NHTSA) requirements define a fast-boot key performance indicator (KPI) for rearview backup camera systems, defining that the camera system shall provide an image of the area behind the vehicle in two seconds or less after the vehicle's direction selector is placed in reverse (which may occur immediately after the vehicle is started). Such requirements prevent the use of some types of computing hardware having protected boot methods, because such protected boot methods may require more than two seconds to launch and complete integrity verifications.

Safety, reliability and resilience requirements benefit from protected boot on the parts of the computing system considered to be "untrusted". However, the "trusted" portion of the system often must be available first—or as soon as possible—after startup or power reset. Thus, some automotive systems are required to include a "trusted world" (e.g., trusted execution environment) and a hardware-backed data store and secure storage for applications in this trusted world. These systems may also require a tamper-resistant/anti-replay secure storage to protect connected devices, code, and sensitive data. The use of trusted computing system components requires many extra security protections (and protected boot options) which typically results in a challenge to satisfy boot-time or execution-time KPIs.

BRIEF DESCRIPTION OF THE DRAWINGS

In the drawings, which are not necessarily drawn to scale, like numerals may describe similar components in different views. Like numerals having different letter suffixes may represent different instances of similar components. Some embodiments are illustrated by way of example, and not limitation, in the figures of the accompanying drawings in which.

DETAILED DESCRIPTION

Figure 1:
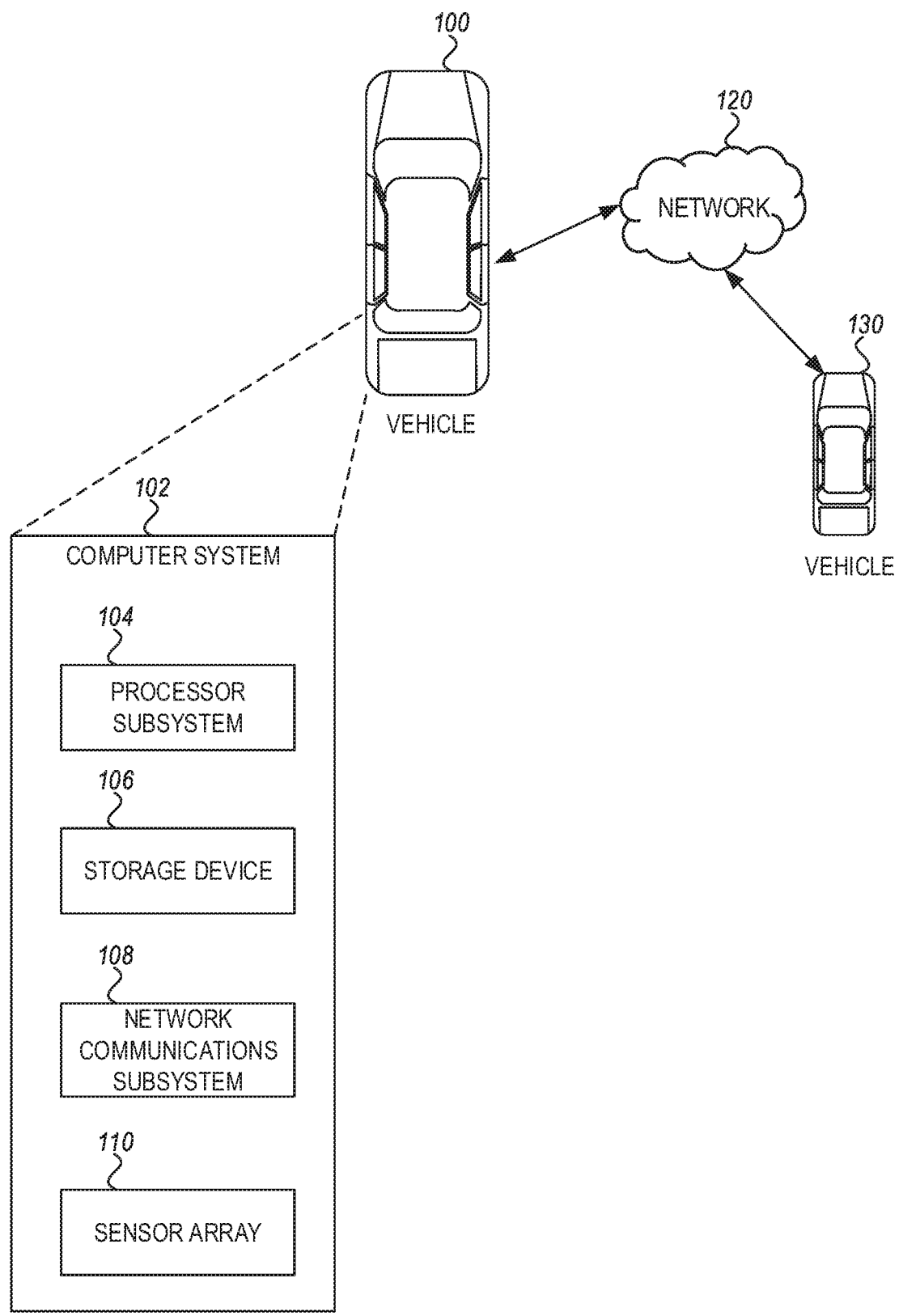
FIG. 1 illustrates an overview of a vehicle computing system deployed in an industrial Internet of Things (IIoT) use case, according to an example.

In the following description, methods, configurations, and related apparatuses are disclosed for in-memory integrity checks which enable secure yet accelerated boot and trusted execution operations. In an example, memory integrity checks and secure enclaves are used to implement an IIoT "trusted world" in a trusted computing configuration where, unlike conventional computing systems, the secure enclave does not require a protected boot mechanism. Trust is established by a context switch into a "trusted world" application executing from a secure enclave associated with a hardware root-of-trust. This trust is established without dependency on secure boot procedures performed on components in the system that would otherwise be needed to establish the integrity of the trusted world component.

With use of the present techniques, a quick path to entering the trusted world environment includes avoidance of traditional protected boot integrity operations after a power on or power reset. Once the trusted world environment is available, the critical operations (e.g., time-critical IIoT activities) can be completed by various applications within the time frame allowed by KPIs. Thus, boot performance KPIs can be met, without sacrificing trust or use of a secure/trusted environment.

Additionally, the integrity of other applications that launch and execute in an "untrusted world" can still be measured and verified without the use of traditional protected boot methods. Subsequent untrusted world operations are often launched from a protected boot to ensure availability, reliability, safety and other goals. However, because the computing system is already operational, there is no value to verifying the untrusted world with conventional trusted boot operations (which would require a power reset). Instead, the present techniques include use of a memory scanning engine (e.g., a management engine (ME), a configured graphics processing unit (GPU), field-programmable gate array (FPGA), application-specific integrated circuit (ASIC), or enhanced memory controller) to provide a dynamic root-of-trust for measurement (DRTM). This DRTM may measure the memory pages containing the "untrusted world" and be used to verify parts of the operating system (OS), virtual machine manager (VMM), virtual machine (VM) and software applications (e.g., ring-3 applications).

The present techniques also improve the reliability of "untrusted" applications by issuing an app initialization token used by the untrusted app to restore operational state information from a previous execution session. The token value may also be used to prove to the trusted world or other apps that it started normally (e.g., under proper conditions as defined by the DRTM process).

The types of security checks and validations discussed herein may be implemented via a variety of methods and hardware configurations. For example, integrity measurements may be checked immediately against a "gold" image policy found in secure storage (e.g., stored in a replay protected memory block (RPMB) partition in an Embedded Multimedia Card (eMMC), Universal Flash Storage (UFS), or non-volatile memory express (NVMe) flash drive) or may be saved in integrity registers (IRs) in secure storage or delivered to a peer node over a network connection.

Fast boot techniques that have been implemented with previous approaches have typically involved stripping down the computing system, peripherals, and execution options to reduce the amount of time required to perform protected boot from power reset forward. In some examples, this has even involved the removal of security features such as protected boot. However, even in stripped down systems, bootup after power reset may not be able to meet applicable KPIs for automotive and other embedded or industrial IoT applications while offering a robust set of features. Likewise, some security environments offer an ability to conduct a trusted launch of specific protected boot data. Such trusted launch mechanisms are generally unable to check applications being launched or relaunched within individual virtual machines (or among multiple virtual machines). Finally, some trusted launch mechanisms typically focus on boot operations only and are unable to re-check the integrity of applications already loaded into memory or loaded at a later time. These and other limitations are addressed with the following configurations.

In particular, the following techniques introduce multiple use cases for a dynamic root of trust measurement process. The primary feature enabling this process is the involvement of a root-of-trust (e.g., provided from hardware that is trusted) and the use of this root-of-trust to access the memory pages where virtual memory management and virtual machines are loaded. The use of dynamic root of trust measurements and evaluation of memory values, as described below, enables the use of a fast secure boot approach that still verifies "secure" and "unsecure" environments among multiple virtual machines, enabling improved performance versus if these same components were launched and used with a traditional sequential approach.

The following systems and techniques may be implemented in, or augment, a variety of computing systems. These include computing environments at or within motor vehicles, which may be particularly sensitive to time latency, integrity verification, security, and trust properties. Thus, various references are made to computing operations in automotive and vehicular settings; however, these computing operations are likewise applicable to other IIoT settings and industries (such as robotics, medical systems, manufacturing, and the like).

FIG. 1 illustrates an overview of an example computing system deployed in an industrial IoT use case. Specifically, FIG. 1 illustrates a vehicle 100, which includes one or more components of a computer system 102 incorporated into the vehicle 100. The vehicle 100 may be of any type of vehicle, such as a commercial vehicle, a consumer vehicle, a recreation vehicle, a car, a truck, a motorcycle, airplane, or a boat. The vehicle 100 may be an autonomous or semi-autonomous vehicle. In general, the computer system 102 includes a processor subsystem 104, and a storage device 106. The processor subsystem 104 may include one or more processors, each with one or more cores. Additionally, the processor subsystem 104 may be disposed on one or more physical devices. The processor subsystem 104 may include one or more specialized processors, such as a graphics processing unit (GPU), a digital signal processor (DSP), a field programmable gate array (FPGA), or a fixed function processor.

The storage device 106 includes one or more devices used to store data. A storage device 106 may include any non-transitory mechanism for storing information in a form readable by a machine (e.g., a computer). For example, a storage device 106 may include read-only memory (ROM), random-access memory (RAM), magnetic disk storage media, optical storage media, flash-memory devices, or other storage devices and media. The storage device 106 may include hardware-based security features, such as those discussed further below.

The computer system 102 may be installed as an after-market component of the vehicle 100, or may be provided as a manufacturer option. As an after-market component, the computer system 102 may plug into the existing infrastructure in the vehicle 100. As non-limiting example, the computer system 102 may support, enable, integrate, provide, or be used in one of many subsystems in a vehicle 100, including but not limited to engine control systems, navigation systems, driver assistance systems, safety systems, infotainment systems, and the like.

For instance, the computer system 102 may support, enable, integrate, or provide a sensor array 110, which may include various forward, side, and rearward facing cameras, radar, Light Detection and Ranging (LIDAR, ultrasonic, global navigation system (e.g., global positioning system (GPS)), or other sensors. In another aspect, the computer system 102 may support, enable, or be integrated with various other sensors as part of the sensor array 110, such as driver identification sensors (e.g., a seat sensor, an eye tracking and identification sensor, a fingerprint scanner, a voice recognition module, or the like), occupant sensors, cameras or visual data sensors, or various environmental sensors to detect wind velocity, outdoor temperature, barometer pressure, rain/moisture, or the like.

In another aspect, the computer system 102 may support, enable, or be integrated with an on-board diagnostics system to record vehicle operation and other aspects of the vehicle's performance, maintenance, or status. The on-board diagnostics system may determine various vehicle state data, such as whether the windshield wipers are activated, whether the driving lights are activated, whether a sunroof is open or closed, etc. Other aspects of the computer system 102 may involve execution of a variety of other software applications or logic to perform specific actions for vehicle use cases.

Components of the computer system 102 may communicate using a network communications subsystem 108 to communicate over various networks (such as via network 120), with such networks including local-area networks (LAN), wide-area networks (WAN), wireless networks (e.g., IEEE 802.11 or 4G/5G cellular network), the Public Switched Telephone Network (PSTN) network, ad hoc networks, personal area networks (e.g., Bluetooth), vehicle-based networks (e.g., Controller Area Network (CAN) BUS), or other combinations or permutations of network protocols and network types. The network may include a single local area network (LAN) or wide-area network (WAN), or combinations of LANs or WANs, such as the Internet.

The various devices coupled to the network 120 may be coupled to the network 120 via one or more wired or wireless connections. For instance, the network 120 may be used to facilitate a vehicular computing environment with another vehicle 130, such as via Vehicle-to-Infrastructure (V2X), Vehicle-to-Vehicle (V2V), and Vehicle-to-Infrastructure (V2I) services from vehicle user equipment (UE) or human-operated portable UEs (e.g., mobile smartphones and computing devices). In additional examples (not shown), other access or uses of intelligent transportation systems, fog or edge computing systems, and other distributed or remote computing systems may be provided via network 120.

The following examples provide specific reference to secure enclaves, including secure enclave features provided by Intel® SGX and ARM® TrustZone environments. However, other types and forms of trusted execution environments may also be used, provided that the use of the secure enclave occurs in a trusted or verified setting. For instance, Intel® SGX integrity guarantee is tied to CPU uCode, so that trust can exist for the SGX environment simply if the SGX environment exists on the computing system. Additionally, Intel SGX supports a Platform Services Enclave (an enclave operating at a lower system level, that securely offers services to other higher system level enclaves). Platform services enclave and other system support enclaves can run at lower levels, such as with a hypervisor where there is context regarding I/O, guest OS, and other resources that the application enclave may eventually require.

With the concepts discussed herein, an untrusted boot of the hypervisor (e.g., a VM launcher from the hypervisor/VMM) is sufficient to establish trust in the application enclave and the platform services enclave—because these enclaves rely on CPU uCode for trust and not the VM launcher. Accordingly, with the following examples, trusted application code can be quickly initialized and run in a "trusted" world or environment, among multiple layers of VMs, OSes, and applications, without the latency associated with a traditional trusted/secure boot.

Figure 2:
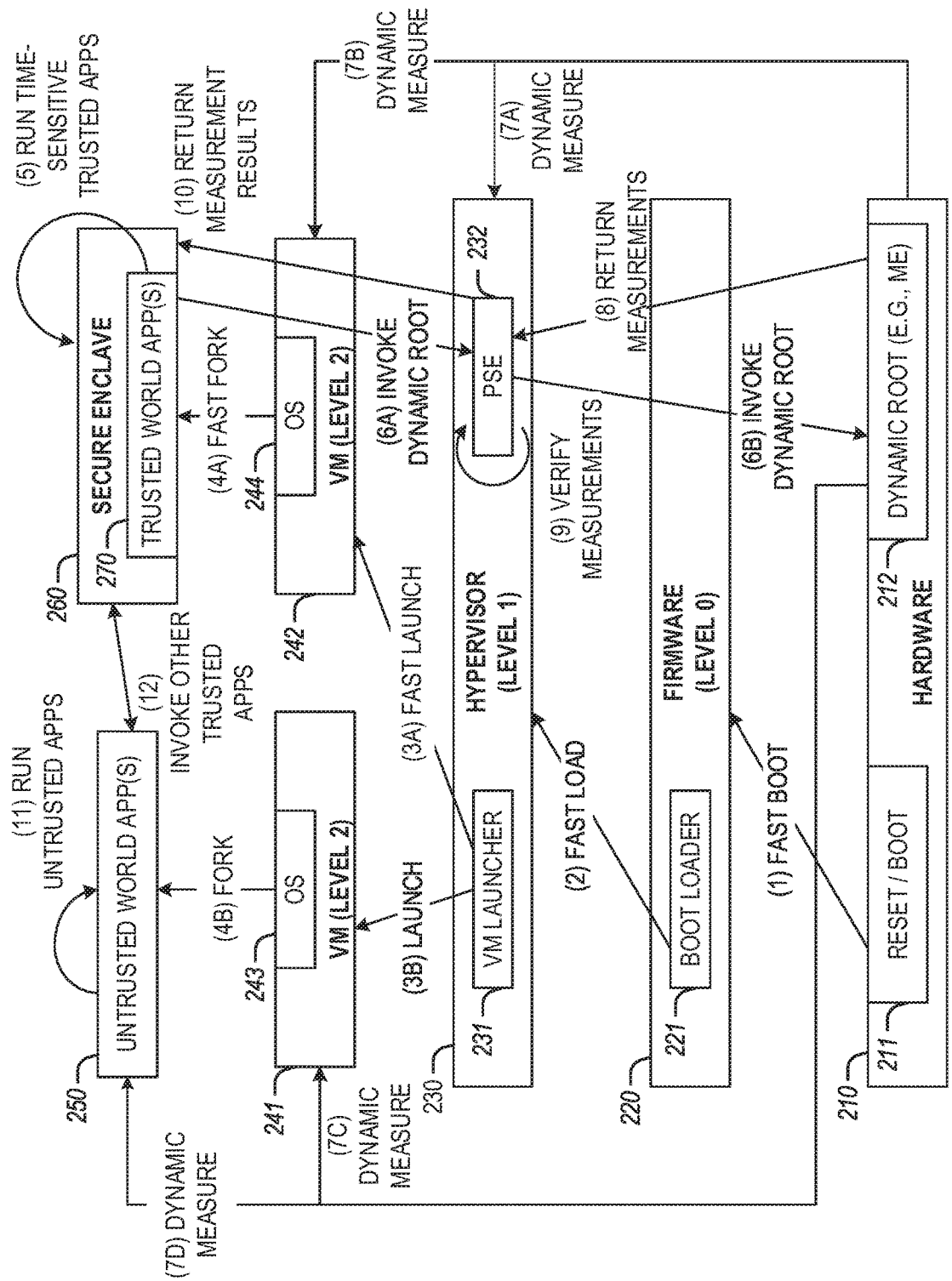
FIG. 2 illustrates an architectural arrangement of a computing system adapted for verified secure boot and execution operations, according to an example.

FIG. 2 illustrates an architectural arrangement of an example computing system adapted for verified secure boot and execution operations. The example computing system is depicted from the perspective of a number of operational layers, starting with hardware 210 and proceeding with consecutive higher software layers (Level 0-Level 3). The depicted software layers include firmware 220 at a lowest level (Level 0), a hypervisor 230 at a next highest level (Level 1), respective virtual machines (VMs) 241, 242 which include operating systems (OSes) at a next highest level (Level 2), and applications 250, 270 operating at a highest level (Level 3). The applications are further depicted as including a set of "untrusted" applications 250 executing in what is labeled as a "untrusted world" environment, and a set of "trusted" applications 270 executing with a secure enclave 260, in what is labeled as a "trusted world" environment.

The arrangement of FIG. 2 is further annotated with a numerical sequence of operations. Operations (1)-(5) illustrate how one or more of the trusted world applications 270 (for instance, time-sensitive trusted applications required at boot) may be launched as soon as possible, from a secure enclave associated with a dynamic root of trust 212. Operations (6)-(12) illustrate how, in the context of the trusted and untrusted worlds, one or more of the untrusted world applications 250 may be verified before execution using the dynamic root of trust measurements.

Figure 3A:
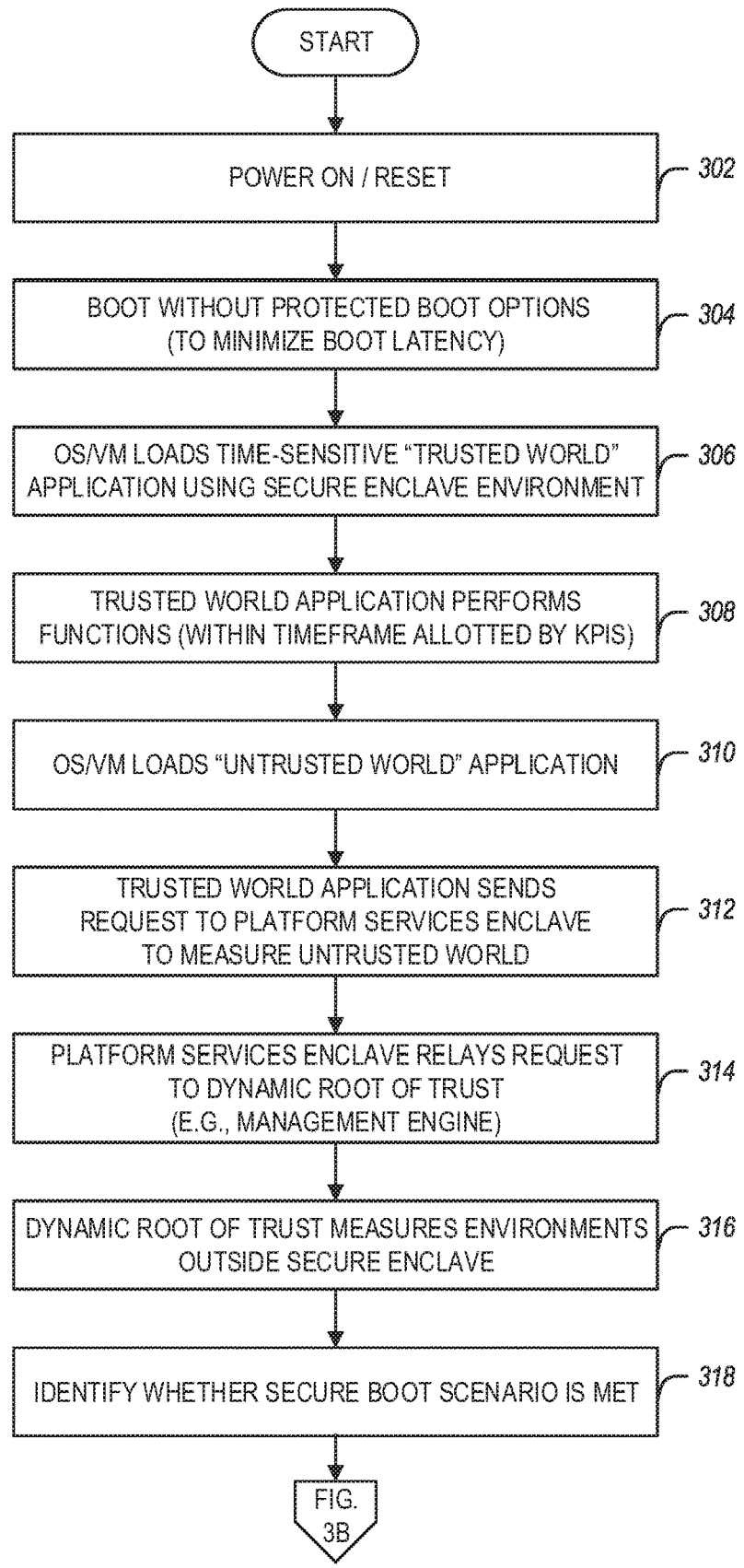
FIGS. 3A and 3B illustrate a flowchart to perform the verified boot and execution operations of FIG. 2, according to an example.
Figure 3B:
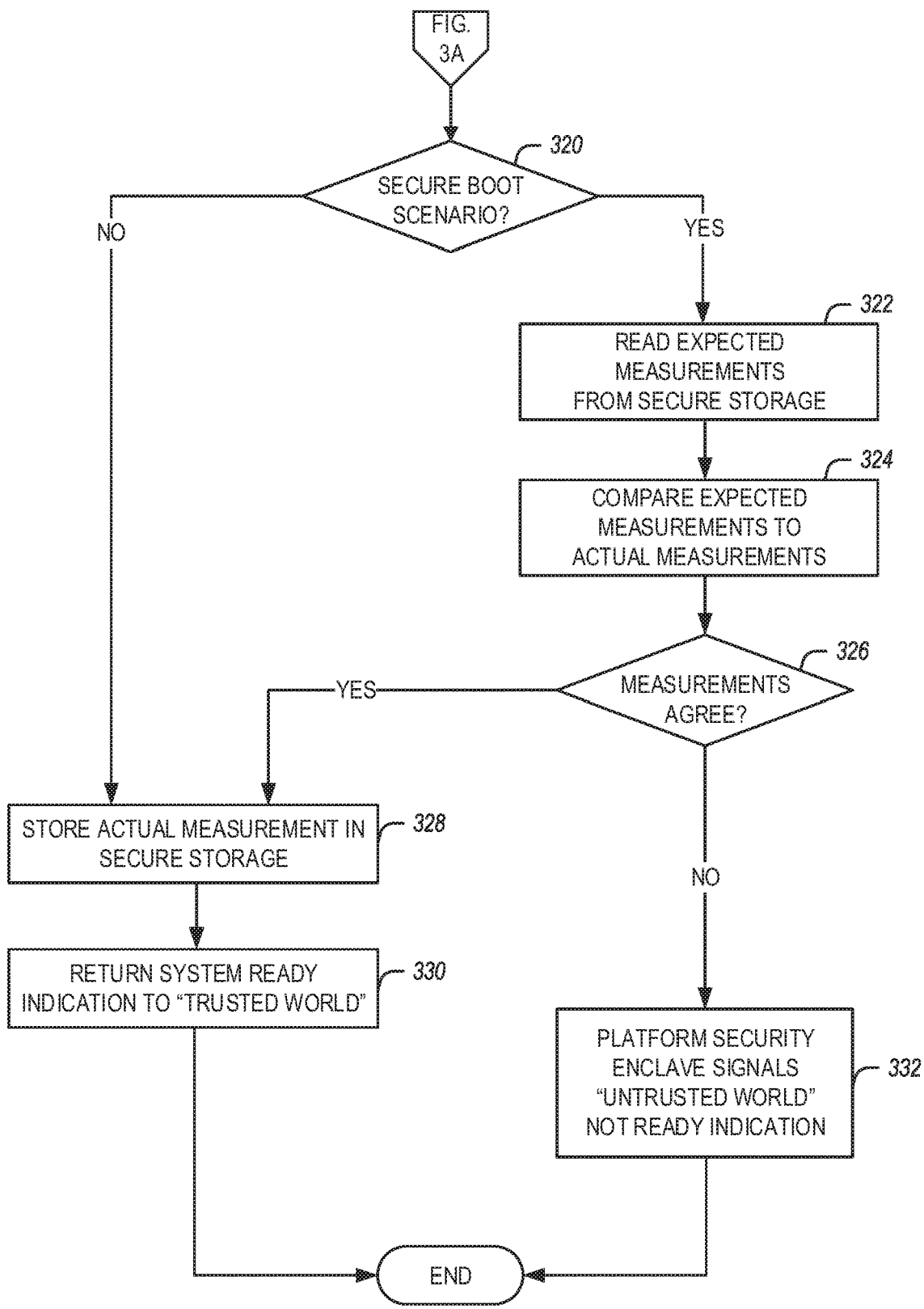

FIGS. 3A and 3B illustrate a flowchart to perform the verified boot and execution operations of FIG. 2. Within the flowchart of FIG. 3A, operations are performed to establish and start an execution of a trusted application using a fast boot in a "trusted world" environment. Within the flowchart of FIG. 3B, later operations are performed to establish, verify, and start an execution of an untrusted application in an "untrusted world" environment using the dynamic root of trust measurements.

First, an operation 302 in FIG. 3A includes the hardware 210 causing or providing a power on or reset operation 211. This power on/RESET causes a fast boot sequence to be triggered, as shown with sequence item (1) in FIG. 2. This fast boot sequence omits traditional protected boot operations of the computing system which may take a large amount of time.

Next, an operation 304 is performed by a boot loader 221 of the firmware 220, to securely boot the system without the use of protected boot operations. The boot loader 221 further invokes the fast load sequence, shown with sequence item (2) in FIG. 2, to load the virtual machine manager (e.g., a hypervisor 230), while still omitting traditional protected boot operations. In scenarios not using virtualization, an OS may be directly loaded instead.

Next, an operation 306 is performed by a virtual machine launcher 231 of the hypervisor 230 (or other virtual machine manager) to launch and initialize a virtual machine. The virtual machine launcher 231 then invokes a fast launch sequence, shown with sequence (3A) in item FIG. 2, to fast launch the virtual machine 242 hosting the "Trusted World" application (omitting traditional protected boot operations). The operating system 244 of the VM 242 (which, when executing trusted world apps 270, provides the "trusted world") performs a fast fork operation, shown with sequence item (4A) in FIG. 2, to cause execution of one or more trusted world applications 270. At this point, the "Trusted World" application is protected using the security and trust features established by the secure enclave 260.

Continuing, an operation 308 is performed by the secure enclave 260 to cause the one or more trusted world applications 270 to perform one or more functions, shown with sequence (5) in item FIG. 2. For example, the one or more trusted world applications may conduct time critical operations required immediately following system reset/power on. This execution or an action caused by the execution thus can be performed within the timeframe specified by application specifications, KPIs, or the like.

In an example, the trusted world critical processing and initialization includes setting an identifier (e.g., a "Trusted-World-Ready" bit) that instructs trusted world (and the associated OS 244, and VM 242) to continue with any subsequent processing of other trusted apps. Additionally, the use of this identifier allows later requests that invoke the secure applications from an untrusted world to be honored (if, verification of the untrusted world is enabled, based on the following dynamic root of trust measurement process).

The remaining portions of FIG. 3A detail the execution and verification of the untrusted world application. At operation 310, in response to the launch sequence (3B), the other instance of the OS and VM (VM 241, OS 243) performs a fork operation, shown with sequence (4B), to prepare for execution of one or more untrusted world applications 250. This fork operation may occur in tandem with sequence (4A) or may be held back until sequence (4A) completes, depending on parallel thread availability.

At operation 312, the secure enclave 260 proceeds with operations to verify (e.g., measure the integrity) of the untrusted world, by invoking the dynamic root of trust 212. This is shown with sequence (6A) with a request to a platform services enclave, as the request specifies a dynamic integrity check. At operation 314, the platform service enclave 232 relays the dynamic integrity check request to the dynamic root of trust 212, shown with sequence (6B). The dynamic root of trust may be established from various hardware or memory components, such as with use of a management engine (ME), field-programmable gate array (FPGA), application-specific integrated circuit (ASIC), a memory controller, and the like.

At operation 316, the dynamic root of trust 212 measures the environments outside of the secure enclave. For instance, a dynamic root of trust measurement process can be used to perform in-memory integrity checks of all environments outside of a secure enclave including the virtual machine environment (hypervisor 231, VMs 241, 242), OSes (243, 244), and untrusted world applications (250), such as depicted with sequences (7A), (7B), (7C), (7D).

The flow of FIG. 3A concludes at operation 318 with an evaluation of whether the secure boot scenario is met, which may be provided by returning the integrity check values to the platform service enclave 232, as depicted with sequence (8), followed by the verification of the measurements, as depicted with sequence (9). If the integrity checks are successful (verified), then the hypervisor 230 schedules one or more untrusted world virtual machines(s) and untrusted world applications (e.g., VM 241, apps 250), such as is enabled with sequences (3B) and (4B). Based on verification of the measurements, untrusted world applications 250 can execute, as shown with sequence (11), as soon as the VM 241 for the untrusted world applications 250 is booted. If integrity checks are not successful (not verified), then the hypervisor 230 may enter a failure or safe mode.

The app execution sequence (11) in FIG. 2 may include a method for the "untrusted world" to obtain a token that authorizes use of an application in the untrusted world. (The use of the term "untrusted," in this context, simply distinguishes the environment from the "trusted" environment of the secure enclave, and does not necessarily imply a binary choice or determination regarding trustworthiness). Finally, with the verified use of untrusted world applications 250, these applications 250 may invoke (or re-invoke) other trusted world applications 270, as shown with sequence (12).

In a further example, the dynamic root of trust measurements (e.g., from sequences (7A)-(7D)) may occur in tandem, resulting in updates to PCRs or integrity registers belonging to the untrusted world. Additionally, tokens that correspond to the untrusted side may be tracked with tokens, and trusted platform module NV (TPM-NV) access may be authorized using the app token that corresponds to the untrusted app. Specifically, the untrusted app uses the token to initialize the app context as being trusted.

FIG. 3B provides additional detail on operations which may be implemented to perform and respond to the measurements discussed above. In a secure boot scenario, determined from evaluation 320, the flowchart depicts that expected measurements may be read from secure storage at operation 322 and compared with actual measurements at operation 324. If the measurements do not agree (or otherwise cannot be validated), as a result of evaluation 326, then the platform service enclave 232 can signal an indication at operation 332 that the untrusted world is not ready, or the platform service enclave 232 or other components can take other remedial or preventative action.

If the measurements agree or can be validated, determined from evaluation 326, then the measurements are stored in secure storage at operation 328, and the system may proceed to a state (or return an indication) that indicates use of the trusted world at operation 330. Likewise, if no secure boot scenario exists, determined from evaluation 320, then operations 328, 330 can be used to bypass the measurement checks.

In an example applicable to an AMD® architecture, Hypervisor Protected Code Integrity (HVCI) may be used to protect a Secure Enclave 260 in the trusted world from integrity threats. AMD Secure Encrypted Virtualization (SEV) may be used to confidentiality protect the trusted world 260 as well.

A variety of other isolation techniques, based on hardware-supported security features, could be applied to create a TEE environment for the secure enclave 260. Each approach may have different trusted boot requirements and properties. For example, multiple types of hardware-assisted security features may use a platform service enclave 232 in a similar manner as is described above for Intel® SGX. A hypervisor using task isolation/vCPU isolation (as is described for isolating untrusted world apps 250 from trusted world apps (270)) may be used to create a "Platform Service Enclave World" that contains measurement verification, attestation, administration and the other functions described by 232. Due to the smaller footprint (code and memory) of the platform service enclave "world" and the trusted world VMs, such components may boot and launch more quickly than the untrusted world.

Additionally, in some secure environments, a platform service enclave world may have trusted (dedicated/isolated) access to security functionality contained in IO attached devices such as FPGA, RPMB, TPM, and the like. These features may be used to perform boot integrity checks of the untrusted world (250, 243, 231) or attestations. For example, in a Device Identifier Composition Engine (DICE) layering architecture, the platform service enclave world may perform a Platform Active Root of Trust (PaRoT) function that passes a nonce to each of the untrusted world entities as they boot/initialize. The signature over the nonce is returned to the PaRoT for signature verification. The PaRoT may maintain an asynchronous boot logging history of signature events relative to the boot state of the untrusted world or it may enforce a synchronous boot logging history where boot progress is restricted until each signature can be verifier (possibly slowing overall boot progress but with increased security). The DICE/PaRoT approach may provide an alternative to sequence (9) depicted in FIG. 2.

Note that in a multi-core system where there are enough cores to assign each 'world' a dedicated core, and where the platform service enclave/PaRoT world doesn't enforce synchronous boot logging, the booting of all three worlds may occur in parallel. Additionally, the hypervisor may apply vCPU allocation policy that assigns additional (e.g., a fourth) physical CPU to the platform service enclave 232 to further speed up boot (assuming the boot software has been parallelized).

Additionally, if the platform service enclave and secure worlds can benefit from security offload/acceleration (e.g. RPMB, FPGA, TPM etc.) the IO devices may contain a DICE RoT and other DICE layers that support dynamic attestation of the booted/booting IO device. These layers may be used so that the PSE/PaRoT may simultaneously check the trusted boot state of the IO devices used to implement other security, trusted boot, attestation, key management functions as needed to support the trusted boot of the untrusted and trusted worlds.

Figure 4:
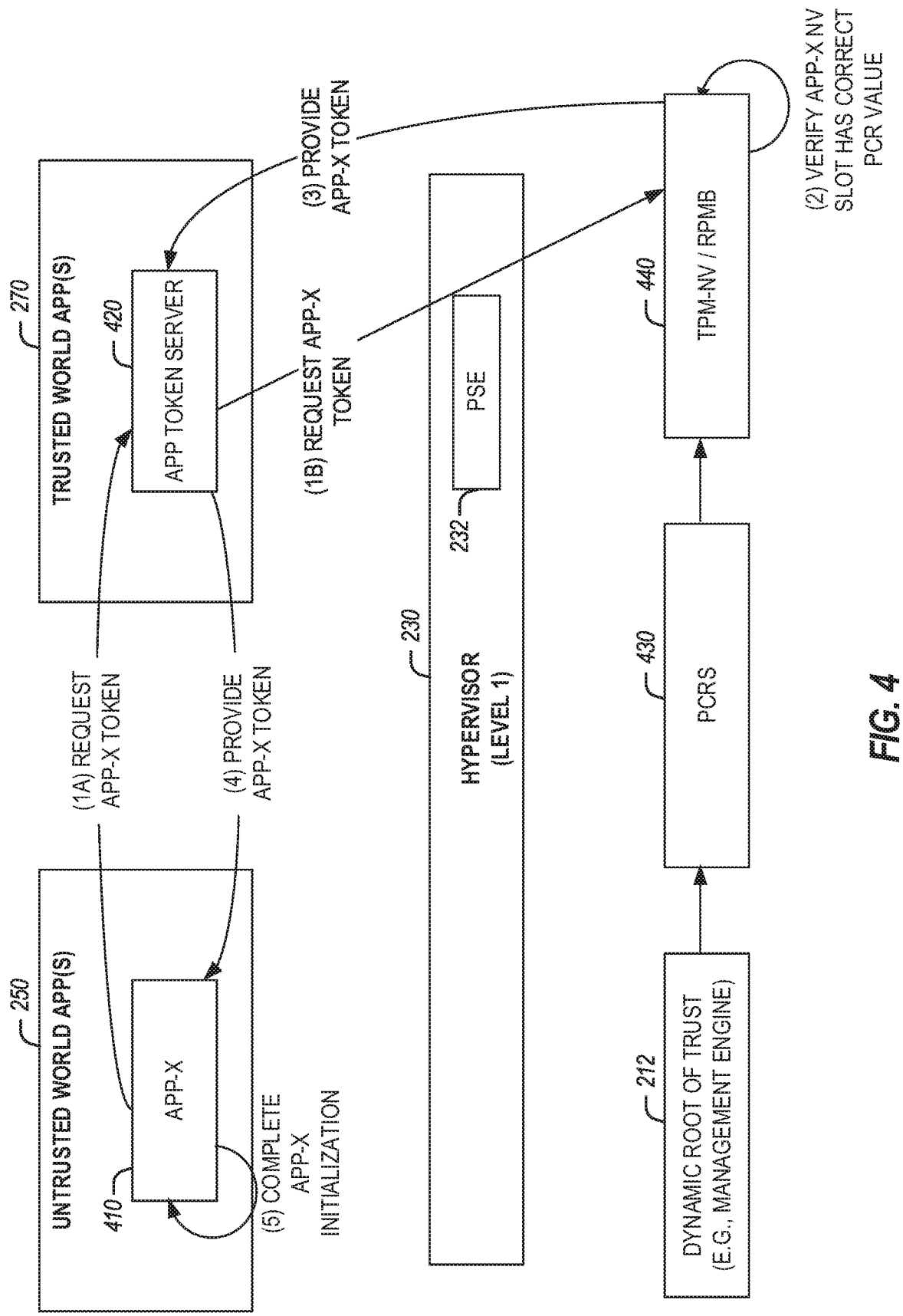
FIG. 4 illustrates a control flow within a computing system for an untrusted application invocation sequence, according to an example.

FIG. 4 illustrates a control flow within a computing system for an untrusted application invocation sequence. Specifically, this control flow shows how an untrusted app (e.g., App-X 410) may be invoked in a sequence, after the dynamic root of trust measurement checks described above, while being coordinated with an application token.

As shown in FIG. 4, after obtaining the dynamic root of trust measurements to perform an integrity check of the various untrusted world components, a set of initialization vectors are provisioned into secured non-volatile memory (e.g., TPM-NV, RPMB, eMMC, etc.). These vectors may only be released when the integrity registers have an expected value. For example, when a particular application (e.g., App-X 410) is measured successfully, a corresponding non-volatile memory location (e.g., in trusted storage subsystem 440) is available for release of the initialization token.

Figure 5:
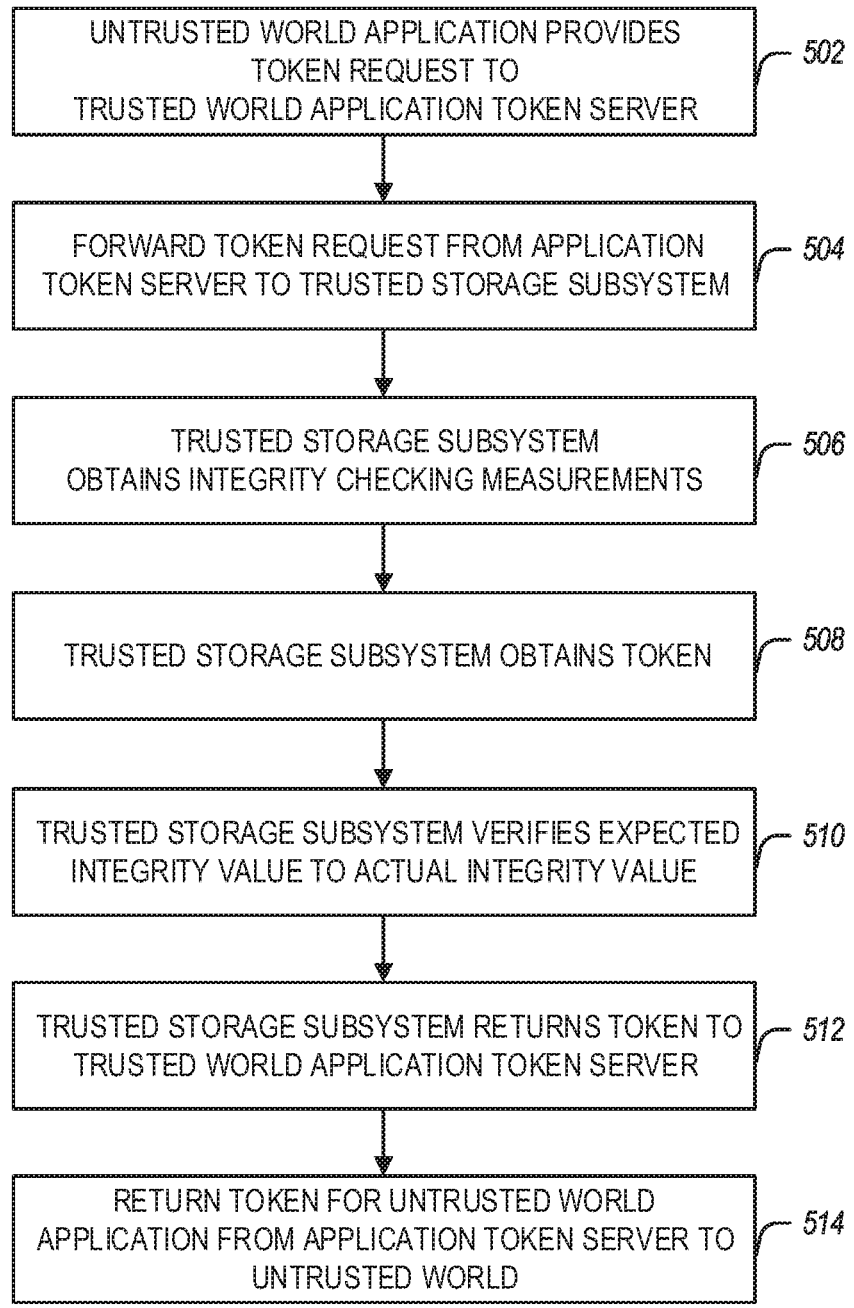
FIG. 5 illustrates a flowchart to perform the control flow of FIG. 4, according to an example.

FIG. 5 illustrates a flowchart to perform the control flow of FIG. 4. With reference to the sequential operations and components depicted in FIG. 4, the token access steps may include the following:

First, at operation 502, a particular application 410 from the untrusted world (e.g., one of the untrusted world applications 250) sends a token request, shown with sequence (1A), to an application token server 420. This application token server executes in the trusted world one of the trusted world applications 270. At operation 504, the request is forwarded to the trusted storage subsystem 440, shown with sequence (1B). This trusted storage subsystem may include NV storage or other storage components discussed above.

Next, at operation 506, the trusted storage subsystem 440 obtains the integrity checking measurements, and at operation 508 obtains the token. At operation 510, the trusted storage subsystem 440 verifies that expected integrity value assigned to the NV slot matches the actual integrity value (e.g., a TPM PCR 430), shown with sequence (2).

At operation 510, after verification of the expected value to the actual value, the App-X token is returned to the token server 420, shown with sequence (3). At operation 512, the App-X token is forwarded to the untrusted world requestor, App-X 410, shown with sequence (4). Then at operation 514, the requesting application 410 can use the token to initialize itself and begin processing duties (shown with sequence (5)).

In some scenarios, it may be possible for improper software (e.g., malware) in the untrusted world to intercept, modify, delete or replay token values. As a result, the trusted world components (e.g., the trusted applications, OS, VMM, etc.) can require that App-X use the correct token value, or services may be restricted. Additional security mechanisms may be implemented based on the token, such as with failures or unexpected behaviors that can trigger a re-check of untrusted world components to detect possible malware.

Additionally, app initialization tokens may be made available only when the integrity checks have completed successfully, so that other applications (including apps in the trusted world) can detect when an improper token is used—signaling a possible integrity violation scenario. This can be achieved without reliance on a protected boot system (which may have been a long time since it was last executed).

Further extensions of the preceding examples may include use of other dynamic measurement engines and platforms (such as a FPGA, GPU, ASIC or memory controller) as the root-of-trust to produce the dynamic measurements, and the use of repeat operations to re-scan memory contents multiple times. Such repeat operations may be important for verifying trust in highly available systems that stay operational for extended periods of time.

Figure 6:
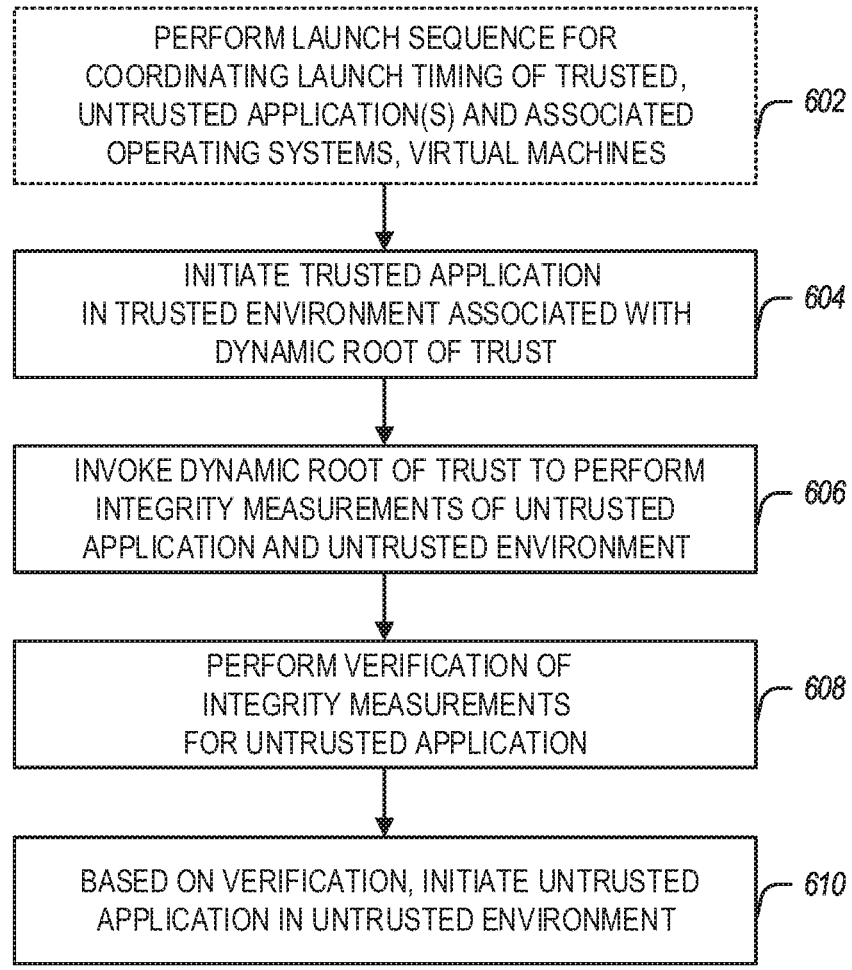
FIG. 6 illustrates a flowchart of an example method for coordinating execution of trusted and untrusted applications using a dynamic root of trust measurement, according to an example.

FIG. 6 illustrates a flowchart of an example method for coordinating execution of trusted and untrusted applications using a dynamic root of trust measurement. The flowchart begins with an optional precondition, at operation 602, to perform a launch sequence for achieving a coordinated launch timing of trusted and untrusted system components. As detailed in the examples above (and depicted in FIGS. 2-3B), this may include coordinating a launch timing of trusted and untrusted applications and associated operating systems, virtual machines, virtual machine managers, and firmware. This launch may be initiated based on a reset or boot of the computing system, or like scenarios for launching.

The flowchart continues at operation 604 with the initiation of a trusted application in a trusted environment associated with dynamic root of trust hardware. This initiation may include instructions to cause or trigger a virtual machine, operating system, and secure enclave to initiate (e.g., begin execution of) a trusted application in a trusted environment. This initiation may occur in a fast boot scenario, where the trusted application is immediately booted before other applications or sets of applications. In various examples the root of trust hardware is a management engine (ME), field-programmable gate array (FPGA), or application-specific integrated circuit (ASIC).

The flowchart continues at operation 606 with the use of the dynamic root of trust to perform integrity measurements of computing system components. In an example, these integrity measurements are performed on respective untrusted applications, and other components of the untrusted environment (e.g., VM, OS, etc.). These untrusted applications are initiated from other virtual machines and applications after initiation of the trusted application (e.g., in the fast boot configuration). In further examples, the initialization vectors discussed above are obtained (and subsequently verified) as part of the integrity measurements.

The flowchart continues at operation 608 with the verification of these integrity measurements for the untrusted application (and, other components of the untrusted environment). In an example, the verification of the dynamic integrity measurements is performed with a platform service enclave component, as the platform service enclave component is also associated with the root of trust hardware.

The flowchart completes at operation 610 with the initiating and execution of untrusted applications in the untrusted environment, based on success of the verification of the integrity measurements. Thus, even though the trusted application is configured to execute before the untrusted application without a full secure boot process, the trust for the secure enclave can be established and maintained based on the association between the secure enclave and the root of trust hardware, and the trust for the corresponding unsecure execution environment can be established and maintained based on the association of dynamic root of trust measurements and the root of trust hardware.

In further examples, the verification of the integrity measurements may be accomplished as the root of trust hardware provides the dynamic integrity measurements to the platform service enclave component, and as the platform service enclave component provides results of the dynamic integrity measurements to the secure enclave. Additionally, the platform service enclave component may be operated within a hypervisor or other virtual memory manager, as the hypervisor is used to launch the first virtual machine and the second virtual machine. In addition to measurements for the first virtual machine, the dynamic integrity measurements may include the measurements for the hypervisor and the second virtual machine.

In further examples, the preceding examples of network communications and operations may be integrated among a number of Internet of Things (IoT) and like device-based network communication and processing architectures. The IoT is a concept in which a large number of computing devices are interconnected to each other and to the Internet to provide functionality and data acquisition at very low levels. Thus, as used herein, an IoT device may include a semiautonomous device performing a function, such as sensing or control, among others, in communication with other IoT devices and a wider network, such as the Internet.

IoT devices are physical or virtualized objects that may communicate on a network (typically at the edge or endpoint of a network), and may include sensors, actuators, and other input/output components, such as to collect data or perform actions from a real-world environment. For example, IoT devices may include low-powered devices that are embedded or attached to everyday things, such as buildings, vehicles, packages, etc., to provide sensor, data, or processing functionality. Recently, IoT devices have become more popular and thus applications and use cases using these devices have proliferated.

Various standards have been proposed to more effectively interconnect and operate IoT devices and IoT network use cases, including those with multi-access edge computing (MEC) and mobile network architectures. Some of the relevant communication and network architecture standards include those distributed by groups such as ETSI, 3rd Generation Partnership Project (3GPP), Institute of Electrical and Electronics Engineers (IEEE), in addition to specialized IoT application interaction architecture and configuration standards distributed by working groups such as the Open Connectivity Foundation (OCF).

Often, IoT devices are limited in memory, size, or functionality, enabling larger numbers to be deployed for a similar cost to smaller numbers of larger devices. However, an IoT device may be a smart phone, laptop, tablet, or PC, or other larger device. Further, an IoT device may be a virtual device, such as an application on a smart phone or other computing device. IoT devices may include IoT gateways, used to couple IoT devices to other IoT devices and to cloud applications, for data storage, process control, and the like.

Figure 7:
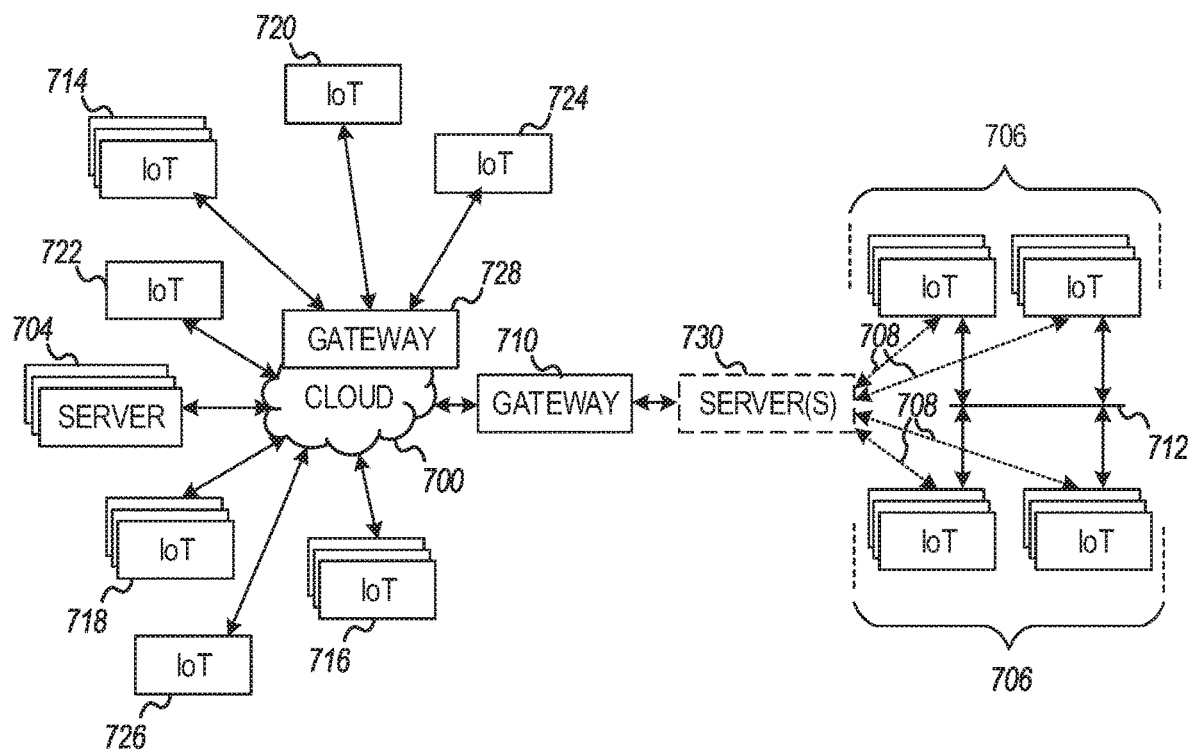
FIG. 7 illustrates a distributed computing network provided with Internet of Things (IoT) devices, according to an example.

FIG. 7 illustrates an example distributed computing network, connected via cloud 700, in communication with a number of Internet of Things (IoT) devices. The cloud 700 may represent the Internet, or may be a local area network (LAN), or a wide area network (WAN), such as a proprietary network for a company. The IoT devices may include any number of different types of devices, grouped in various combinations. For example, a traffic control group 706 may include IoT devices along streets in a city. These IoT devices may include stoplights, traffic flow monitors, cameras, weather sensors, and the like. The traffic control group 706, or other subgroups, may be in communication with the cloud 700 through wired or wireless links 708, such as LPWA links, and the like. Further, a wired or wireless sub-network 712 may allow the IoT devices to communicate with each other, such as through a local area network, a wireless local area network, and the like. The IoT devices may use another device, such as a gateway 710 to communicate with the cloud 700.

Other example groups of IoT devices may include remote weather stations 714, local information terminals 716, alarm systems 718, automated teller machines 720, alarm panels 722, or moving vehicles, such as emergency vehicles 724 or other vehicles 726, among many others. Each of these IoT devices may be in communication with other IoT devices, with servers 704, with another IoT Fog device or system, or a combination therein. The groups of IoT devices may be deployed in various residential, commercial, industrial, settings (including both private or public settings).

As may be seen from FIG. 7, a large number of IoT devices may be communicating through the cloud 700. This may allow different IoT devices to request or provide information to other devices autonomously. For example, the traffic control group 706 may request a current weather forecast from a group of remote weather stations 714, which may provide the forecast without human intervention. Further, an emergency vehicle 724 may be alerted by an automated teller machine 720 that a burglary is in progress. As the emergency vehicle 724 proceeds towards the automated teller machine 720, it may access the traffic control group 706 to request clearance to the location, for example, by lights turning red to block cross traffic at an intersection in sufficient time for the emergency vehicle 724 to have unimpeded access to the intersection.

Clusters of IoT devices, such as the remote weather stations 714 or the traffic control group 706, may be equipped to communicate with other IoT devices as well as with the cloud 700. This may allow the IoT devices to form an ad-hoc network between the devices, allowing them to function as a single device, which may be termed a Fog device or system.

Networks of IoT devices may include commercial and home automation devices, such as water distribution systems, electric power distribution systems, pipeline control systems, plant control systems, light switches, thermostats, locks, cameras, alarms, motion sensors, and the like. The IoT devices may be accessible through remote computers, servers, and other systems, for example, to control systems or access data.

The future growth of the Internet, edge computing, and dynamic network settings may involve very large numbers of IoT devices. Accordingly, in the context of the techniques discussed herein, a number of innovations for such future networking will address the need for all these layers to grow unhindered, to discover and make accessible connected resources, and to support the ability to hide and compartmentalize connected resources. Any number of network protocols and communications standards may be used, wherein each protocol and standard is designed to address specific objectives. Further, the protocols are part of the fabric supporting human accessible services that operate regardless of location, time or space. The innovations include service delivery and associated infrastructure, such as hardware and software; security enhancements; and the provision of services based on QoS terms specified in SLA and service delivery agreements.

Figure 8:
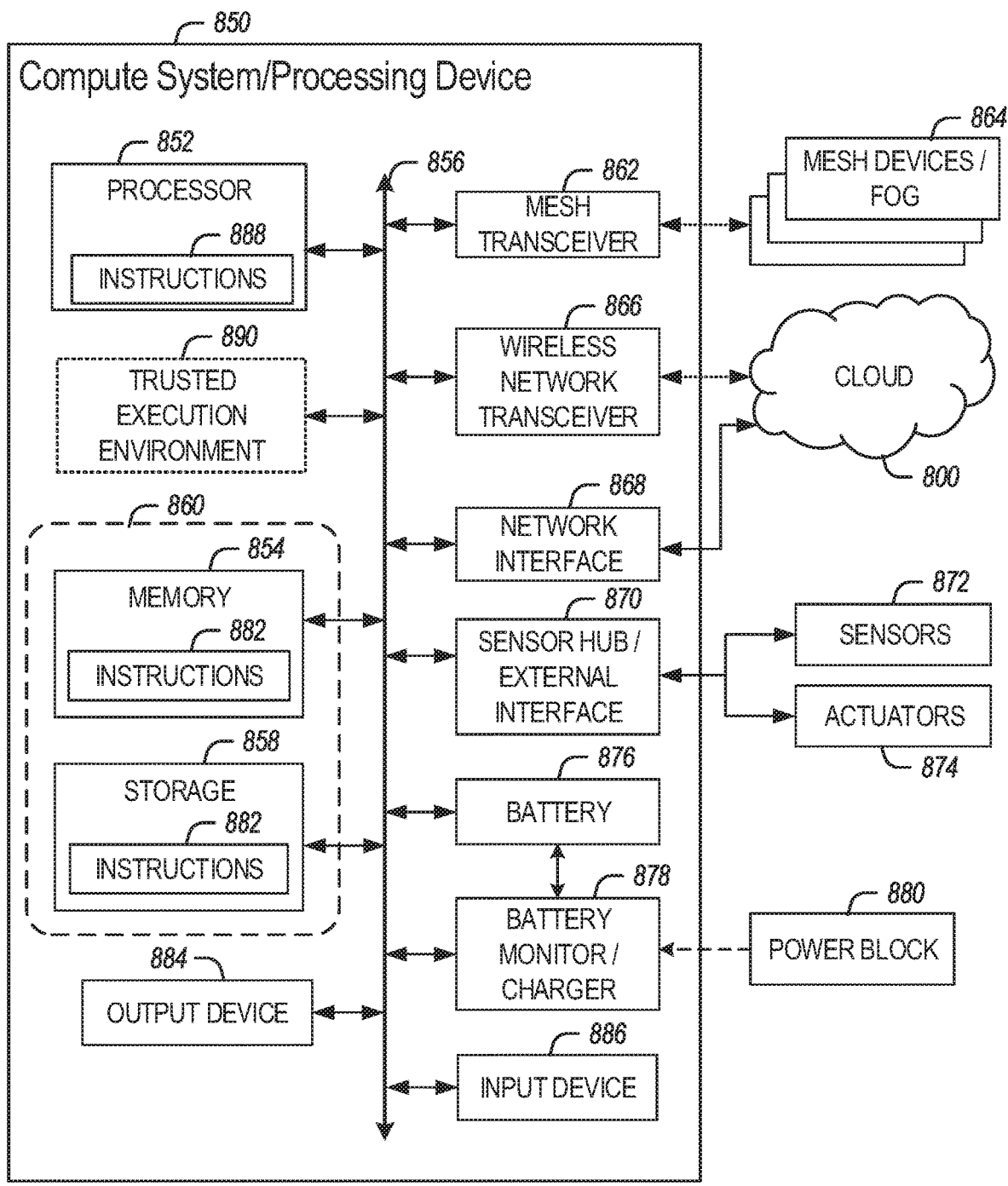
FIG. 8 illustrates a block diagram of components that may be present in a compute system or other processing device to implement the disclosed techniques, according to an example.

FIG. 8 is a block diagram of an example of components that may be present in a compute system 850 (e.g., computing device, IoT device, vehicle compute platform, or any like processing device) for implementing the techniques described herein. The compute system 850 may include any combinations of the components shown in the example or referenced in the disclosure above. Further to the examples herein, the compute system 850 may be embodied as a smartphone, a mobile compute device, a smart appliance, an in-vehicle compute system (e.g., a navigation system), or other device or system capable of performing the described functions.

The components of the compute system 850 may be implemented as ICs, portions thereof, discrete electronic devices, or other modules, logic, hardware, software, firmware, or a combination thereof adapted in the compute system 850, or as components otherwise incorporated within a chassis of a larger system. Additionally, the block diagram of FIG. 8 is intended to depict a high-level view of components, such as would be included in an example IIoT execution platform. However, some of the components shown may be omitted, additional components may be present, and different arrangement of the components shown may occur in other implementations.

The compute system 850 may include a processor 852, which may be a microprocessor, a multi-core processor, a multithreaded processor, an ultra-low voltage processor, an embedded processor, or other known processing element. The processor 852 may be a part of a system on a chip (SoC) in which the processor 852 and other components are formed into a single integrated circuit, or a single package, such as the Edison™ or Galileo™ SoC boards from Intel. As an example, the processor 852 may include an Intel® Architecture Core™ based processor, such as a Quark™, an Atom™, an i3, an i5, an i7, or an MCU-class processor, or another such processor available from Intel® Corporation, Santa Clara, CA However, any number other processors may be used, such as available from Advanced Micro Devices, Inc. (AMD) of Sunnyvale, CA, a MIPS-based design from MIPS Technologies, Inc. of Sunnyvale, CA, an ARM-based design licensed from ARM Holdings, Ltd. or customer thereof, or their licensees or adopters. The processors may include units such as an A5-A13 processor from Apple® Inc., a Snapdragon™ processor from Qualcomm® Technologies, Inc., or an OMAP™ processor from Texas Instruments, Inc.

The processor 852 may communicate with a system memory 854 over an interconnect 856 (e.g., a bus). Any number of memory devices may be used to provide for a given amount of system memory. As examples, the memory may be random access memory (RAM) in accordance with a Joint Electron Devices Engineering Council (JEDEC) design such as the DDR or mobile DDR standards (e.g., LPDDR, LPDDR2, LPDDR3, or LPDDR4). In particular examples, a memory component may comply with a DRAM standard promulgated by JEDEC, such as JESD79F for DDR SDRAM, JESD79-2F for DDR2 SDRAM, JESD79-3F for DDR3 SDRAM, JESD79-4A for DDR4 SDRAM, JESD209 for Low Power DDR (LPDDR), JESD209-2 for LPDDR2, JESD209-3 for LPDDR3, and JESD209-4 for LPDDR4. In various implementations the individual memory devices may be of any number of different package types such as single die package (SDP), dual die package (DDP) or quad die package (Q17P). These devices, in some examples, may be directly soldered onto a motherboard to provide a lower profile solution, while in other examples the devices are configured as one or more memory modules that in turn couple to the motherboard by a given connector. Any number of other memory implementations may be used, such as other types of memory modules, e.g., dual inline memory modules (DIMMs) of different varieties including but not limited to microDIMMs or MiniDIMMs.

To provide for persistent storage of information such as data, applications, operating systems and so forth, a storage 858 may also couple to the processor 852 via the interconnect 856. In an example the storage 858 may be implemented via a solid state disk drive (SSDD). Other devices that may be used for the storage 858 include flash memory cards, such as SD cards, microSD cards, xD picture cards, and the like, and USB flash drives. In low power implementations, the storage 858 may be on-die memory or registers associated with the processor 852. However, in some examples, the storage 858 may be implemented using a micro hard disk drive (HDD). Further, any number of new technologies may be used for the storage 858 in addition to, or instead of, the technologies described, such resistance change memories, phase change memories, holographic memories, or chemical memories, among others.

The components may communicate over the interconnect 856. The interconnect 856 may include any number of technologies, including industry standard architecture (ISA), extended ISA (EISA), peripheral component interconnect (PCI), peripheral component interconnect extended (PCIx), PCI express (PCIe), or any number of other technologies. The interconnect 856 may be a proprietary bus, for example, used in a SoC based system. Other bus systems may be included, such as an I2C interface, an SPI interface, point to point interfaces, and a power bus, among others.

The interconnect 856 may couple the processor 852 to a mesh transceiver 862, for communications with other mesh devices 864. The mesh transceiver 862 may use any number of frequencies and protocols, such as 2.4 Gigahertz (GHz) transmissions under the IEEE 802.15.4 standard, using the Bluetooth® low energy (BLE) standard, as defined by the Bluetooth® Special Interest Group, or the ZigBee® standard, among others. Any number of radios, configured for a particular wireless communication protocol, may be used for the connections to the mesh devices 864. For example, a WLAN unit may be used to implement Wi-Fi™ communications in accordance with the Institute of Electrical and Electronics Engineers (IEEE) 802.11 standard. In addition, wireless wide area communications, e.g., according to a cellular or other wireless wide area protocol, may occur via a WWAN unit.

The mesh transceiver 862 may communicate using multiple standards or radios for communications at different range. For example, the compute system 850 may communicate with close devices, e.g., within about 10 meters, using a local transceiver based on BLE, or another low power radio, to save power. More distant mesh devices 864, e.g., within about 50 meters, may be reached over ZigBee or other intermediate power radios. Both communications techniques may take place over a single radio at different power levels, or may take place over separate transceivers, for example, a local transceiver using BLE and a separate mesh transceiver using ZigBee.

A wireless network transceiver 866 may be included to communicate with devices or services in the cloud 800 via local or wide area network protocols. The wireless network transceiver 866 may be a LPWA transceiver that follows the IEEE 802.15.4, or IEEE 802.15.4g standards, among others. The compute system 850 may communicate over a wide area using LoRaWAN™ (Long Range Wide Area Network) developed by Semtech and the LoRa Alliance. The techniques described herein are not limited to these technologies, but may be used with any number of other cloud transceivers that implement long range, low bandwidth communications, such as Sigfox, and other technologies. Further, other communications techniques, such as time-slotted channel hopping, described in the IEEE 802.15.4e specification may be used.

Any number of other radio communications and protocols may be used in addition to the systems mentioned for the mesh transceiver 862 and wireless network transceiver 866, as described herein. For example, the radio transceivers 862 and 866 may include an LTE or other cellular transceiver that uses spread spectrum (SPA/SAS) communications for implementing high speed communications. Further, any number of other protocols may be used, such as Wi-Fi® networks for medium speed communications and provision of network communications.

The radio transceivers 862 and 866 may include radios that are compatible with any number of 3GPP (Third Generation Partnership Project) specifications, such as Long Term Evolution (LTE), Long Term Evolution-Advanced (LTE-A), and Long Term Evolution-Advanced Pro (LTE-A Pro). It may be noted that radios compatible with any number of other fixed, mobile, or satellite communication technologies and standards may be selected. These may include, for example, any Cellular Wide Area radio communication technology, which may include e.g. a 5th Generation (5G) communication systems, a Global System for Mobile Communications (GSM) radio communication technology, a General Packet Radio Service (GPRS) radio communication technology, or an Enhanced Data Rates for GSM Evolution (EDGE) radio communication technology, a UMTS (Universal Mobile Telecommunications System) communication technology, In addition to the standards listed above, any number of satellite uplink technologies may be used for the wireless network transceiver 866, including, for example, radios compliant with standards issued by the ITU (International Telecommunication Union), or the ETSI (European Telecommunications Standards Institute), among others. The examples provided herein are thus understood as being applicable to various other communication technologies, both existing and not yet formulated.

A network interface controller (NIC) 868 may be included to provide a wired communication to the cloud 800 or to other devices, such as the mesh devices 864. The wired communication may provide an Ethernet connection, or may be based on other types of networks, such as Controller Area Network (CAN), Local Interconnect Network (LIN), DeviceNet, ControlNet, Data Highway+, PROFIBUS, or PROFINET, among many others. An additional NIC 868 may be included to allow connect to a second network, for example, a NIC 868 providing communications to the cloud over Ethernet, and a second NIC 868 providing communications to other devices over another type of network.

The interconnect 856 may couple the processor 852 to an external interface 870 or sensor hub that is used to connect external devices or subsystems. The external devices may include sensors 872, such as accelerometers, level sensors, flow sensors, optical light sensors, camera sensors, temperature sensors, a global positioning system (GPS) sensors, pressure sensors, barometric pressure sensors, and the like. The external interface 870 further may be used to connect the compute device to actuators 874, such as power switches, valve actuators, an audible sound generator, a visual warning device, and the like.

In some optional examples, various input/output (I/O) devices may be present within, or connected to, the compute system 850. For example, a display or other output device 884 may be included to show information, such as sensor readings or actuator position. An input device 886, such as a touch screen or keypad may be included to accept input. An output device 884 may include any number of forms of audio or visual display, including simple visual outputs such as binary status indicators (e.g., LEDs) and multi-character visual outputs, or more complex outputs such as display screens (e.g., LCD screens), with the output of characters, graphics, multimedia objects, and the like being generated or produced from the operation of the compute system 850.

A battery 876 may power the compute system 850, although in examples in which the compute system 850 is mounted in a fixed location, it may have a power supply coupled to an electrical grid. The battery 876 may be a lithium ion battery, or a metal-air battery, such as a zinc-air battery, an aluminum-air battery, a lithium-air battery, and the like.

A battery monitor/charger 878 may be included in the compute system 850 to track the state of charge (SoCh) of the battery 876. The battery monitor/charger 878 may be used to monitor other parameters of the battery 876 to provide failure predictions, such as the state of health (SoH) and the state of function (SoF) of the battery 876. The battery monitor/charger 878 may include a battery monitoring integrated circuit, such as an LTC4020 or an LTC2990 from Linear Technologies, an ADT7488A from ON Semiconductor of Phoenix Arizona, or an IC from the UCD90xxx family from Texas Instruments of Dallas, TX The battery monitor/charger 878 may communicate the information on the battery 876 to the processor 852 over the interconnect 856. The battery monitor/charger 878 may also include an analog-to-digital (ADC) converter that allows the processor 852 to directly monitor the voltage of the battery 876 or the current flow from the battery 876. The battery parameters may be used to determine actions that the compute system 850 may perform, such as transmission frequency, mesh network operation, sensing frequency, and the like.

A power block 880, or other power supply coupled to a grid, may be coupled with the battery monitor/charger 878 to charge the battery 876. In some examples, the power block 880 may be replaced with a wireless power receiver to obtain the power wirelessly, for example, through a loop antenna in the compute system 850. A wireless battery charging circuit, such as an LTC4020 chip from Linear Technologies of Milpitas, CA, among others, may be included in the battery monitor/charger 878. The specific charging circuits chosen depend on the size of the battery 876, and thus, the current required. The charging may be performed using the Airfuel standard promulgated by the Airfuel Alliance, the Qi wireless charging standard promulgated by the Wireless Power Consortium, or the Rezence charging standard, promulgated by the Alliance for Wireless Power, among others.

The storage 858 may include instructions 882 in the form of software, firmware, or hardware commands to implement the techniques described herein. Although such instructions 882 are shown as code blocks included in the memory 854 and the storage 858, it may be understood that any of the code blocks may be replaced with hardwired circuits, for example, built into an application specific integrated circuit (ASIC).

In an example, the instructions 882 provided via the memory 854, the storage 858, or the processor 852 may be embodied as a non-transitory, machine readable medium 860 including code to direct the processor 852 to perform electronic operations in the compute system 850. The processor 852 may access the non-transitory, machine readable medium 860 over the interconnect 856. For instance, the non-transitory, machine readable medium 860 may be embodied by devices described for the storage 858 of FIG. 8 or may include specific storage units such as optical disks, flash drives, or any number of other hardware devices. The non-transitory, machine readable medium 860 may further include, provide, or invoke instructions 888 to direct the processor 852 to perform a specific sequence or flow of actions, for example, as described with respect to the flowchart(s) and block diagram(s) of operations and functionality depicted above.

In an example, the instructions 888 on the processor 852 (separately, or in combination with the instructions 888 of the machine readable medium 860) may configure execution or operation of a trusted execution environment (TEE) 890, such as the secure enclaves discussed herein. In an example, the TEE 890 operates as a protected area accessible to the processor 852 to enable secure access to data and secure execution of instructions. Various implementations of the TEE 890, and an accompanying secure area in the processor 852 or the memory 854 may be provided, for instance, through use of Intel® Software Guard Extensions (SGX) or ARM® TrustZone® hardware security extensions, AMD® Hypervisor Protected Code Integrity (HVCI) and Secure Encrypted Virtualization (SEV), Intel® Management Engine (ME), or Intel® Converged Security Manageability Engine (CSME). Other aspects of security hardening, hardware roots-of-trust, and trusted or protected operations may be implemented in the system 850 through the TEE 890, the processor 852, and other components discussed or suggested above.

In further examples, a machine-readable medium also includes any tangible medium that is capable of storing, encoding or carrying instructions for execution by a machine and that cause the machine to perform any one or more of the methodologies of the present disclosure or that is capable of storing, encoding or carrying data structures utilized by or associated with such instructions. A "machine-readable medium" thus may include, but is not limited to, solid-state memories, and optical and magnetic media. Specific examples of machine-readable media include non-volatile memory, including but not limited to, by way of example, semiconductor memory devices (e.g., electrically programmable read-only memory (EPROM), electrically erasable programmable read-only memory (EEPROM)) and flash memory devices; magnetic disks such as internal hard disks and removable disks; magneto-optical disks; and CD-ROM and DVD-ROM disks. The instructions embodied by a machine-readable medium may further be transmitted or received over a communications network using a transmission medium via a network interface device utilizing any one of a number of transfer protocols (e.g., HTTP).

A machine-readable medium may be provided by a storage device or other apparatus which is capable of hosting data in a non-transitory format. In an example, information stored or otherwise provided on a machine-readable medium may be representative of instructions, such as instructions themselves or a format from which the instructions may be derived. This format from which the instructions may be derived may include source code, encoded instructions (e.g., in compressed or encrypted form), packaged instructions (e.g., split into multiple packages), or the like. The information representative of the instructions in the machine-readable medium may be processed by processing circuitry into the instructions to implement any of the operations discussed herein. For example, deriving the instructions from the information (e.g., processing by the processing circuitry) may include: compiling (e.g., from source code, object code, etc.), interpreting, loading, organizing (e.g., dynamically or statically linking), encoding, decoding, encrypting, unencrypting, packaging, unpackaging, or otherwise manipulating the information into the instructions.

In an example, the derivation of the instructions may include assembly, compilation, or interpretation of the information (e.g., by the processing circuitry) to create the instructions from some intermediate or preprocessed format provided by the machine-readable medium. The information, when provided in multiple parts, may be combined, unpacked, and modified to create the instructions. For example, the information may be in multiple compressed source code packages (or object code, or binary executable code, etc.) on one or several remote servers. The source code packages may be encrypted when in transit over a network and decrypted, uncompressed, assembled (e.g., linked) if necessary, and compiled or interpreted (e.g., into a library, stand-alone executable, etc.) at a local machine, and executed by the local machine.

It should be understood that the functional units or capabilities described in this specification may have been referred to or labeled as components or modules, in order to more particularly emphasize their implementation independence. Such components may be embodied by any number of software or hardware forms. For example, a component or module may be implemented as a hardware circuit comprising custom very-large-scale integration (VLSI) circuits or gate arrays, off-the-shelf semiconductors such as logic chips, transistors, or other discrete components. A component or module may also be implemented in programmable hardware devices such as field programmable gate arrays, programmable array logic, programmable logic devices, or the like. Components or modules may also be implemented in software for execution by various types of processors. An identified component or module of executable code may, for instance, comprise one or more physical or logical blocks of computer instructions, which may, for instance, be organized as an object, procedure, or function. Nevertheless, the executables of an identified component or module need not be physically located together, but may comprise disparate instructions stored in different locations which, when joined logically together, comprise the component or module and achieve the stated purpose for the component or module.

Indeed, a component or module of executable code may be a single instruction, or many instructions, and may even be distributed over several different code segments, among different programs, and across several memory devices or processing systems. In particular, some aspects of the described process (such as code rewriting and code analysis) may take place on a different processing system (e.g., in a computer in a data center), than that in which the code is deployed (e.g., in a computer embedded in a sensor or robot). Similarly, operational data may be identified and illustrated herein within components or modules, and may be embodied in any suitable form and organized within any suitable type of data structure. The operational data may be collected as a single data set, or may be distributed over different locations including over different storage devices, and may exist, at least partially, merely as electronic signals on a system or network. The components or modules may be passive or active, including agents operable to perform desired functions.

In further examples, any of the compute systems discussed herein may be arranged in distributed or edge computing arrangements, with each computing system or device operating as a "compute node" in a larger coordinated or orchestrated system. Each compute node may be embodied as a type of device, appliance, computer, or other "thing" capable of communicating with other devices, networks, or endpoint components. The compute node may also include, load, or operate specially designed engines, devices, or collections of devices capable of performing various compute functions. In some examples, the compute node may be embodied as a single device such as an integrated circuit, an embedded system, a field-programmable gate array (FPGA), a system-on-a-chip (SOC), or other integrated system or device.

In further examples, any of the compute systems discussed herein may include or be coupled to acceleration circuitry, which may be embodied by one or more artificial intelligence (AI) accelerators, a neural compute stick, neuromorphic hardware, an FPGA, an arrangement of GPUs, one or more SoCs, one or more CPUs, one or more digital signal processors, dedicated ASICs, or other forms of specialized processors or circuitry designed to accomplish one or more specialized tasks. These tasks may include AI processing (including machine learning, training, inferencing, and classification operations), visual data processing, network data processing, object detection, rule analysis, or the like.

Additional examples of the presently described method, system, and device embodiments include the following, non-limiting configurations. Each of the following non-limiting examples may stand on its own, or may be combined in any permutation or combination with any one or more of the other examples provided below or throughout the present disclosure.

Example 1 is a computing system, comprising: root of trust hardware; processing circuitry; and a memory device including instructions embodied thereon, wherein the instructions, which when executed by the processing circuitry, configure the processing circuitry to perform operations to: cause a secure enclave, accessed from a first virtual machine, to initiate a trusted application for a trusted environment; invoke the root of trust hardware to perform dynamic integrity measurements of a second virtual machine and an untrusted application, the second virtual machine being available to initiate the untrusted application for an untrusted environment after initiation of the trusted application; and based on verification of the dynamic integrity measurements, cause the second virtual machine to initiate the untrusted application for the untrusted environment.

In Example 2, the subject matter of Example 1 includes, an example where the verification of the dynamic integrity measurements is performed with a platform service enclave component, the platform service enclave component being associated with the root of trust hardware.

In Example 3, the subject matter of Example 2 includes, an example where the root of trust hardware provides the dynamic integrity measurements to the platform service enclave component, and wherein the platform service enclave component provides results of the dynamic integrity measurements to the secure enclave.

In Example 4, the subject matter of Examples 2-3 includes, an example where the platform service enclave component is operated within a hypervisor, wherein the hypervisor is used to launch the first virtual machine and the second virtual machine.

In Example 5, the subject matter of Example 4 includes, an example where the dynamic integrity measurements further include measurements for the hypervisor and the second virtual machine.

In Example 6, the subject matter of Examples 4-5 includes, an example where the hypervisor is launched with a boot loader in firmware of the computing system, wherein the hypervisor includes a virtual machine launcher to launch the second virtual machine and the first virtual machine respectively, wherein the second virtual machine is launched before the first virtual machine to cause the trusted application to execute before the untrusted application.

In Example 7, the subject matter of Examples 1-6 includes, an example where the root of trust hardware is a management engine (ME), field-programmable gate array (FPGA), or application-specific integrated circuit (ASIC).

In Example 8, the subject matter of Examples 1-7 includes, an example where the operations are initiated based on a reset or boot of the computing system.

In Example 9, the subject matter of Examples 1-8 includes, the instructions further to configure the processing circuitry to perform operations to: in response to initiation of the untrusted application for the untrusted environment, cause the untrusted application to invoke a second trusted application for the trusted environment.

In Example 10, the subject matter of Examples 1-9 includes, secured non-volatile memory, wherein a set of initialization vectors are provisioned into the secured non-volatile memory for use to execute the untrusted application, and wherein the set of initialization vectors are released in response to the verification of the dynamic integrity measurements.

In Example 11, the subject matter of Example 10 includes, an example where the set of initialization vectors is obtained by the untrusted application using a token server operating in the secure enclave, wherein the set of initialization vectors are provided using a token associated with the untrusted application.

In Example 12, the subject matter of Examples 1-11 an example where, wherein trust for the secure enclave is established based on the root of trust hardware, and wherein the trusted application is configured to execute before the untrusted application.

Example 13 is a method of application executing using a dynamic root of trust measurement, comprising operations performed by processing circuitry of a computing system, the operations including: initiating a trusted application for a trusted environment with use of a secure enclave, the secure enclave accessed using a first virtual machine; invoking root of trust hardware to perform dynamic integrity measurements of a second virtual machine and an untrusted application, the second virtual machine being available to initiate the untrusted application for an untrusted environment after initiation of the trusted application; and initiating the untrusted application for the untrusted environment, using the second virtual machine, based on verification of the dynamic integrity measurements.

In Example 14, the subject matter of Example 13 includes, an example where the verification of the dynamic integrity measurements is performed with a platform service enclave component, the platform service enclave component being associated with the root of trust hardware.

In Example 15, the subject matter of Example 14 includes, an example where the root of trust hardware provides the dynamic integrity measurements to the platform service enclave component, and wherein the platform service enclave component provides results of the dynamic integrity measurements to the secure enclave.

In Example 16, the subject matter of Examples 14-15 includes, an example where the platform service enclave component is operated within a hypervisor, wherein the hypervisor is used to launch the first virtual machine and the second virtual machine.

In Example 17, the subject matter of Example 16 includes, an example where the dynamic integrity measurements further include measurements for the hypervisor and the second virtual machine.

In Example 18, the subject matter of Examples 16-17 includes, an example where the hypervisor is launched with a boot loader in firmware, wherein the hypervisor includes a virtual machine launcher to launch the second virtual machine and the first virtual machine respectively, wherein the second virtual machine is launched before the first virtual machine to cause the trusted application to execute before the untrusted application.

In Example 19, the subject matter of Examples 13-18 includes, an example where the root of trust hardware is a management engine (ME), field-programmable gate array (FPGA), or application-specific integrated circuit (ASIC).

In Example 20, the subject matter of Examples 13-19 includes, an example where the method is initiated based on a reset or boot of a computing system.

In Example 21, the subject matter of Examples 13-20 includes, invoking a second trusted application for the trusted environment, using the untrusted application, in response to initiation of the untrusted application for the untrusted environment.

In Example 22, the subject matter of Examples 13-21 includes, an example where a set of initialization vectors are provisioned into secured non-volatile memory for use to execute the untrusted application, and wherein the set of initialization vectors are released in response to the verification of the dynamic integrity measurements.

In Example 23, the subject matter of Example 22 includes, an example where the set of initialization vectors is obtained by the untrusted application using a token server operating in the secure enclave, wherein the set of initialization vectors are provided using a token associated with the untrusted application.

In Example 24, the subject matter of Examples 13-23 includes, an example where trust for the secure enclave is established based on the root of trust hardware, and wherein the trusted application is configured to execute before the untrusted application.

Example 25 is an apparatus comprising: secure enclave means for initiating a trusted application for a trusted environment via a secure enclave, the secure enclave accessed using a first virtual machine; root of trust hardware means for performing dynamic integrity measurements of a second virtual machine and an untrusted application, the second virtual machine being available to initiate the untrusted application for an untrusted environment after initiation of the trusted application; and verification means for initiating the untrusted application for the untrusted environment, using the second virtual machine, based on verification of the dynamic integrity measurements.

In Example 26, the subject matter of Example 25 includes, a platform service enclave means, wherein the verification of the dynamic integrity measurements is performed with the platform service enclave means, the platform service enclave means associated with the root of trust hardware means.

In Example 27, the subject matter of Example 26 includes, an example where the root of trust hardware means provides the dynamic integrity measurements to the platform service enclave component, and wherein the platform service enclave component provides results of the dynamic integrity measurements to the secure enclave.

In Example 28, the subject matter of Examples 26-27 includes, an example where the platform service enclave means is operated by a hypervisor, wherein the hypervisor is used to launch the first virtual machine and the second virtual machine.

In Example 29, the subject matter of Example 28 includes, an example where the dynamic integrity measurements further include measurements for the hypervisor and the second virtual machine.

In Example 30, the subject matter of Examples 28-29 includes, an example where the hypervisor is launched with a boot loader means, wherein the hypervisor includes a virtual machine launcher to launch the second virtual machine and the first virtual machine respectively, wherein the second virtual machine is launched before the first virtual machine to cause the trusted application to execute before the untrusted application.

In Example 31, the subject matter of Examples 25-30 includes, an example where the root of trust hardware means includes a management engine (ME), field-programmable gate array (FPGA), or application-specific integrated circuit (ASIC).

In Example 32, the subject matter of Examples 25-31 includes, a reset and boot means used to start the computing system.

In Example 33, the subject matter of Examples 25-32 includes, an example where a second trusted application is invoked in the trusted environment, using the untrusted application, in response to initiation of the untrusted application for the untrusted environment.

In Example 34, the subject matter of Examples 25-33 includes, an example where a set of initialization vectors are provisioned into secured memory means for use to execute the untrusted application, and wherein the set of initialization vectors are released in response to the verification of the dynamic integrity measurements.

In Example 35, the subject matter of Example 34 includes, an example where the set of initialization vectors is obtained by the untrusted application using a token means, wherein the set of initialization vectors are provided using a token associated with the untrusted application.

In Example 36, the subject matter of Examples 25-35 includes, an example where trust for the secure enclave is established based on the root of trust hardware means, and wherein the trusted application is configured to execute before the untrusted application.

Example 37 is at least one machine-readable medium including instructions that, when executed by processing circuitry, cause the processing circuitry to perform operations to implement of any of Examples 1-36.

Example 38 is at least one machine-readable storage medium, comprising information representative of instructions that, when executed by processing circuitry, cause the processing circuitry to, perform the operations of any of Examples 1-36.

Example 39 may include one or more non-transitory computer-readable media comprising instructions to cause an electronic device, upon execution of the instructions by one or more processors of the electronic device, to perform one or more elements of a method described in or related to any of Examples 1-36, or any other method or process described herein.

Example 40 may include an apparatus comprising logic, modules, or circuitry to perform one or more elements of a method described in or related to any of Examples 1-36, or any other method or process described herein.

Example 41 may include a method, technique, or process as described in or related to any of Examples 1-36, or portions or parts thereof.

Example 42 may include an apparatus comprising: one or more processors and one or more computer readable media comprising instructions that, when executed by the one or more processors, cause the one or more processors to perform the method, techniques, or process as described in or related to any of Examples 1-36, or portions thereof.

Example 43 may include a signal as described in or related to any of examples 1-36, or portions or parts thereof.

Example 44 may include a signal in a wireless network as described in or related to any of Examples 1-36, or as otherwise shown and described herein.

Example 45 may include a method of coordinating communications in a wireless network as described in or related to any of Examples 1-36, or as otherwise shown and described herein.

Example 46 may include a device for processing communications as described in or related to any of Examples 1-36, or as otherwise shown and described herein.

Example 47 is a network comprising respective devices and device communication mediums for performing any of the operations of Examples 1-36, or as otherwise shown and described herein.

Example 48 is an apparatus comprising means to implement of any of Examples 1-47.

Example 49 is a system to implement of any of Examples 1-47.

Example 50 is a method to implement of any of Examples 1-47.

In the above Detailed Description, various features may be grouped together to streamline the disclosure. However, the claims may not set forth every feature disclosed herein as embodiments may feature a subset of said features. Further, embodiments may include fewer features than those disclosed in a particular example. Thus, the following claims are hereby incorporated into the Detailed Description, with a claim standing on its own as a separate embodiment.

What is claimed is:

1. A computing system, comprising:
   root of trust hardware;
   processing circuitry; and
   a memory device including instructions embodied thereon, wherein the instructions, which when executed by the processing circuitry, configure the processing circuitry to perform operations to:
   cause a secure enclave, accessed from a first virtual machine, to initiate a trusted application for a trusted environment, wherein trust for the secure enclave is established based on the root of trust hardware;
   invoke the root of trust hardware to perform dynamic integrity measurements of a second virtual machine and an untrusted application, the second virtual machine being available to initiate the untrusted application for an untrusted environment after initiation of the trusted application; and
   based on verification of the dynamic integrity measurements, cause the second virtual machine to initiate the untrusted application for the untrusted environment, wherein the trusted application is configured to execute before the untrusted application.

2. The computing system of claim 1, wherein the verification of the dynamic integrity measurements is performed with a platform service enclave component, the platform service enclave component being associated with the root of trust hardware.

3. The computing system of claim 2, wherein the root of trust hardware provides the dynamic integrity measurements to the platform service enclave component, and wherein the platform service enclave component provides results of the dynamic integrity measurements to the secure enclave.

4. The computing system of claim 2, wherein the platform service enclave component is operated within a hypervisor, wherein the hypervisor is used to launch the first virtual machine and the second virtual machine.

5. The computing system of claim 4, wherein the dynamic integrity measurements further include measurements for the hypervisor and the second virtual machine.

6. The computing system of claim 4, wherein the hypervisor is launched with a boot loader in firmware of the computing system, wherein the hypervisor includes a virtual machine launcher to launch the second virtual machine and the first virtual machine respectively, wherein the second virtual machine is launched before the first virtual machine to cause the trusted application to execute before the untrusted application.

7. The computing system of claim 1, wherein the root of trust hardware is a management engine (ME), field-programmable gate array (FPGA), or application-specific integrated circuit (ASIC).

8. The computing system of claim 1, wherein the operations are initiated based on a reset or boot of the computing system.

9. The computing system of claim 1, the instructions further to configure the processing circuitry to perform operations to:
   in response to initiation of the untrusted application for the untrusted environment, cause the untrusted application to invoke a second trusted application for the trusted environment.

10. The computing system of claim 1, further comprising secured non-volatile memory, wherein a set of initialization vectors are provisioned into the secured non-volatile memory for use to execute the untrusted application, and wherein the set of initialization vectors are released in response to the verification of the dynamic integrity measurements.

11. The computing system of claim 10, wherein the set of initialization vectors is obtained by the untrusted application using a token server operating in the secure enclave, wherein the set of initialization vectors are provided using a token associated with the untrusted application.

12. At least one non-transitory machine-readable storage device comprising instructions stored thereupon, which when executed by processing circuitry of a computing system, cause the processing circuitry to perform operations comprising:
    initiating a trusted application for a trusted environment with use of a secure enclave, the secure enclave accessed using a first virtual machine, wherein trust for the secure enclave is established based on root of trust hardware;
    invoking the root of trust hardware to perform dynamic integrity measurements of a second virtual machine and an untrusted application, the second virtual machine being available to initiate the untrusted application for an untrusted environment after initiation of the trusted application; and
    initiating the untrusted application for the untrusted environment, using the second virtual machine, based on verification of the dynamic integrity measurements, wherein the trusted application is configured to execute before the untrusted application.

13. The machine-readable storage device of claim 12, wherein the verification of the dynamic integrity measurements is performed with a platform service enclave component, the platform service enclave component being associated with the root of trust hardware.

14. The machine-readable storage device of claim 13, wherein the root of trust hardware provides the dynamic integrity measurements to the platform service enclave component, and wherein the platform service enclave component provides results of the dynamic integrity measurements to the secure enclave.

15. The machine-readable storage device of claim 13, wherein the platform service enclave component is operated within a hypervisor, wherein the hypervisor is used to launch the first virtual machine and the second virtual machine.

16. The machine-readable storage device of claim 15, wherein the dynamic integrity measurements further include measurements for the hypervisor and the second virtual machine.

17. The machine-readable storage device of claim 15, wherein the hypervisor is launched with a boot loader in firmware, wherein the hypervisor includes a virtual machine launcher to launch the second virtual machine and the first virtual machine respectively, wherein the second virtual machine is launched before the first virtual machine to cause the trusted application to execute before the untrusted application.

18. The machine-readable storage device of claim 12, wherein the root of trust hardware is a management engine (ME), field-programmable gate array (FPGA), or application-specific integrated circuit (ASIC).

19. The machine-readable storage device of claim 12, wherein the operations are initiated based on a reset or boot of the computing system.

20. The machine-readable storage device of claim 12, further comprising:

invoking a second trusted application for the trusted environment, using the untrusted application, in response to initiation of the untrusted application for the untrusted environment.

21. The machine-readable storage device of claim 12, wherein a set of initialization vectors are provisioned into secured non-volatile memory for use to execute the untrusted application, and wherein the set of initialization vectors are released in response to the verification of the dynamic integrity measurements.

22. The machine-readable storage device of claim 21, wherein the set of initialization vectors is obtained by the untrusted application using a token server operating in the secure enclave, wherein the set of initialization vectors are provided using a token associated with the untrusted application.

23. An apparatus, comprising:
secure enclave means for initiating a trusted application for a trusted environment via a secure enclave, the secure enclave accessed using a first virtual machine;
root of trust hardware means for performing dynamic integrity measurements of a second virtual machine and an untrusted application, the second virtual machine being available to initiate the untrusted application for an untrusted environment after initiation of the trusted application, wherein trust for the secure enclave is established based on the root of trust hardware means; and
verification means for initiating the untrusted application for the untrusted environment, using the second virtual machine, based on verification of the dynamic integrity measurements, wherein the trusted application is configured to execute before the untrusted application.

* * * * *